United States Patent [19]
Luoma et al.

[11] Patent Number: 4,477,822
[45] Date of Patent: Oct. 16, 1984

[54] GRAPHIC RECORDER

[75] Inventors: Thomas Luoma, Lafayette; Alan Rutherford, Concord, both of Calif.

[73] Assignee: Nicolet Zeta, Concord, Calif.

[21] Appl. No.: 409,890

[22] Filed: Aug. 20, 1982

Related U.S. Application Data

[63] Continuation of Ser. No. 192,820, Oct. 1, 1980, abandoned.

[51] Int. Cl.$^3$ ............................................. G01D 15/28
[52] U.S. Cl. .................................. 346/136; 226/118; 242/184
[58] Field of Search ............................ 346/136, 139 B; 242/184, 183, 182, 75.52, 75.51; 226/118, 119

[56] References Cited

U.S. PATENT DOCUMENTS

| 3,305,873 | 2/1967 | Mourier | 346/136 X |
| 3,504,369 | 3/1970 | Kashkin | 346/32 |
| 3,713,606 | 1/1973 | Van Pelt | 242/184 |
| 3,857,525 | 12/1974 | Gerber | 242/57.1 |
| 3,943,530 | 3/1976 | Mourier | 346/136 |
| 4,158,846 | 6/1979 | Gordon | 346/136 |

OTHER PUBLICATIONS

Roberts, S. D.; Linear Reel Motor Servomechanism; IBM TDB, vol. 13, No. 10, Mar. 1971, pp. 3155-3156.

Primary Examiner—Joseph W. Hartary
Attorney, Agent, or Firm—Kinney & Lange

[57] ABSTRACT

A graphic recorder of the vacuum column buffer type has a pair of wells into which the two loops on the sheet material are drawn down. Top and bottom sensors are provided in each well for maintaining the loops within a predetermined range of movement; but in addition, the supply and take-up rolls are slaved to the speed of the drum. Cross-coupling is provided between the two wells to tend to equalize the vacuums therein.

3 Claims, 8 Drawing Figures

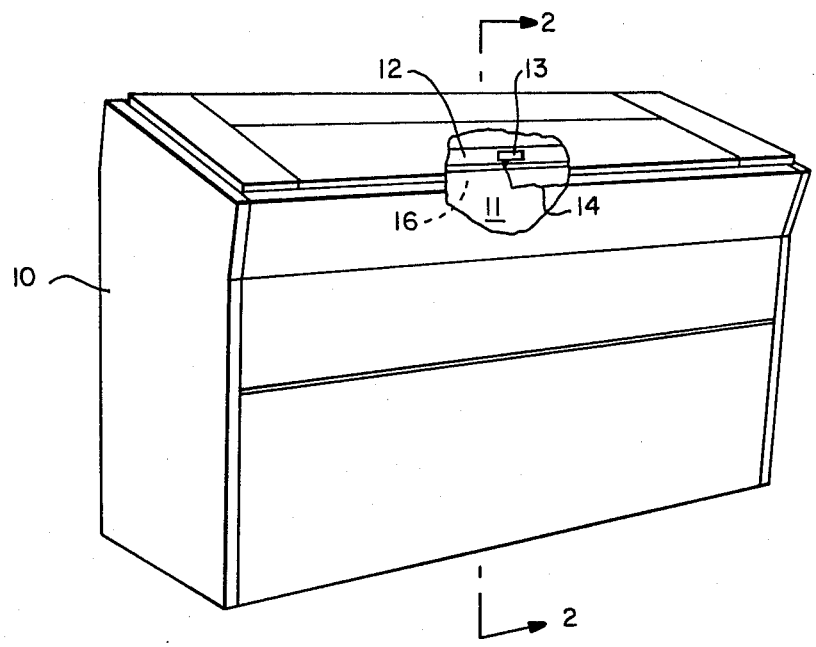
FIG.—1
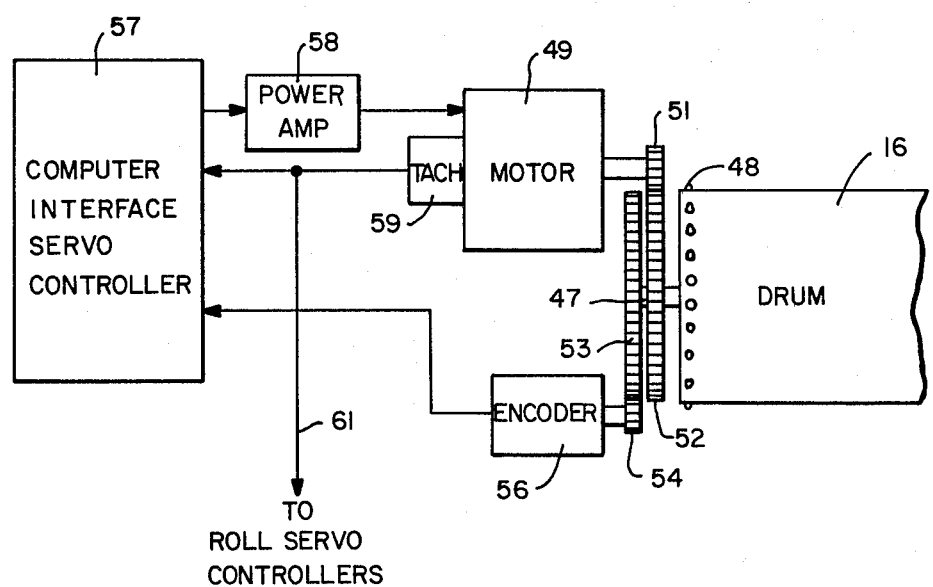
FIG.—4

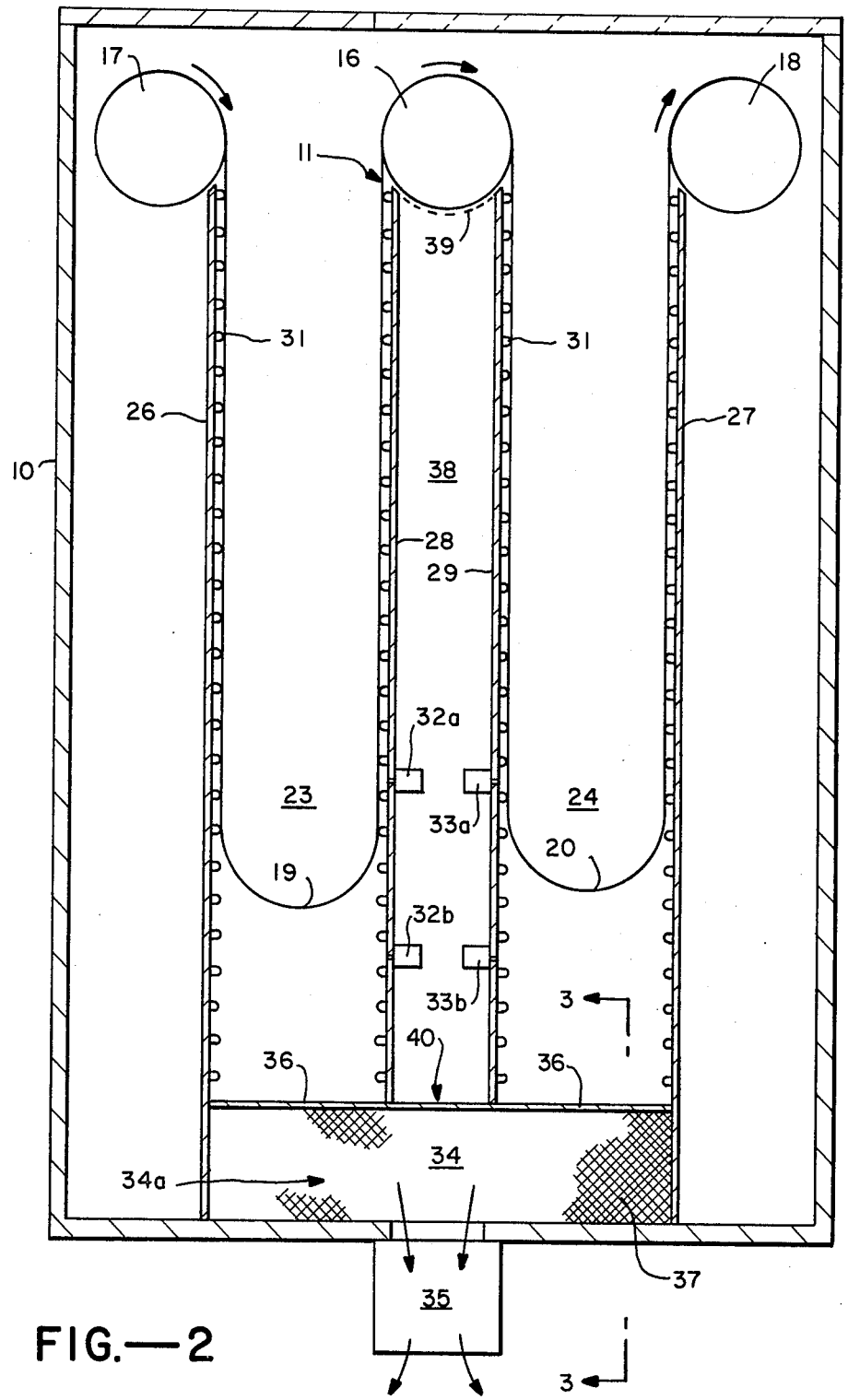
FIG.—2

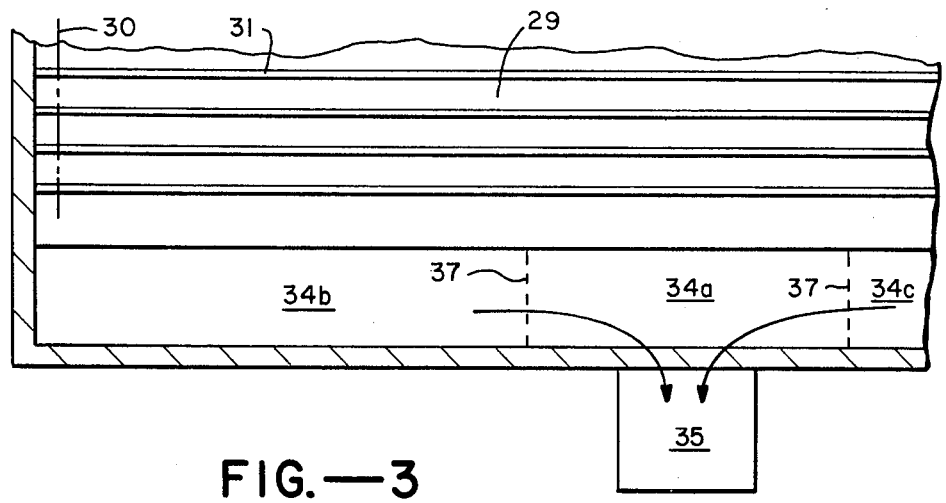
FIG.—3
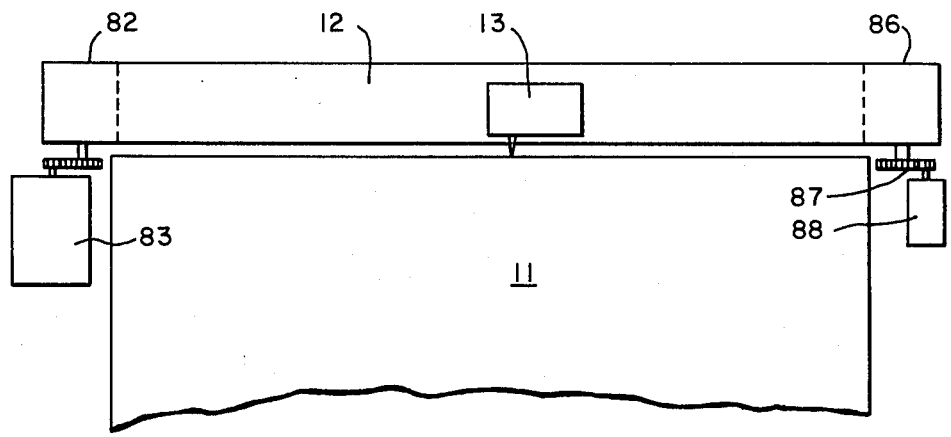
FIG.—6
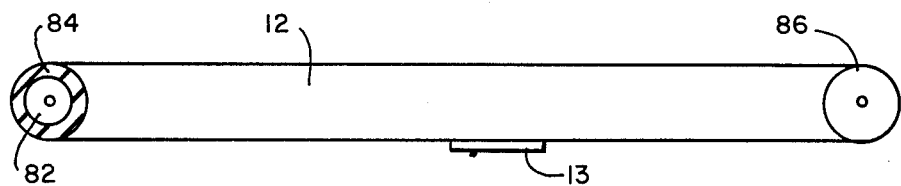
FIG.—7

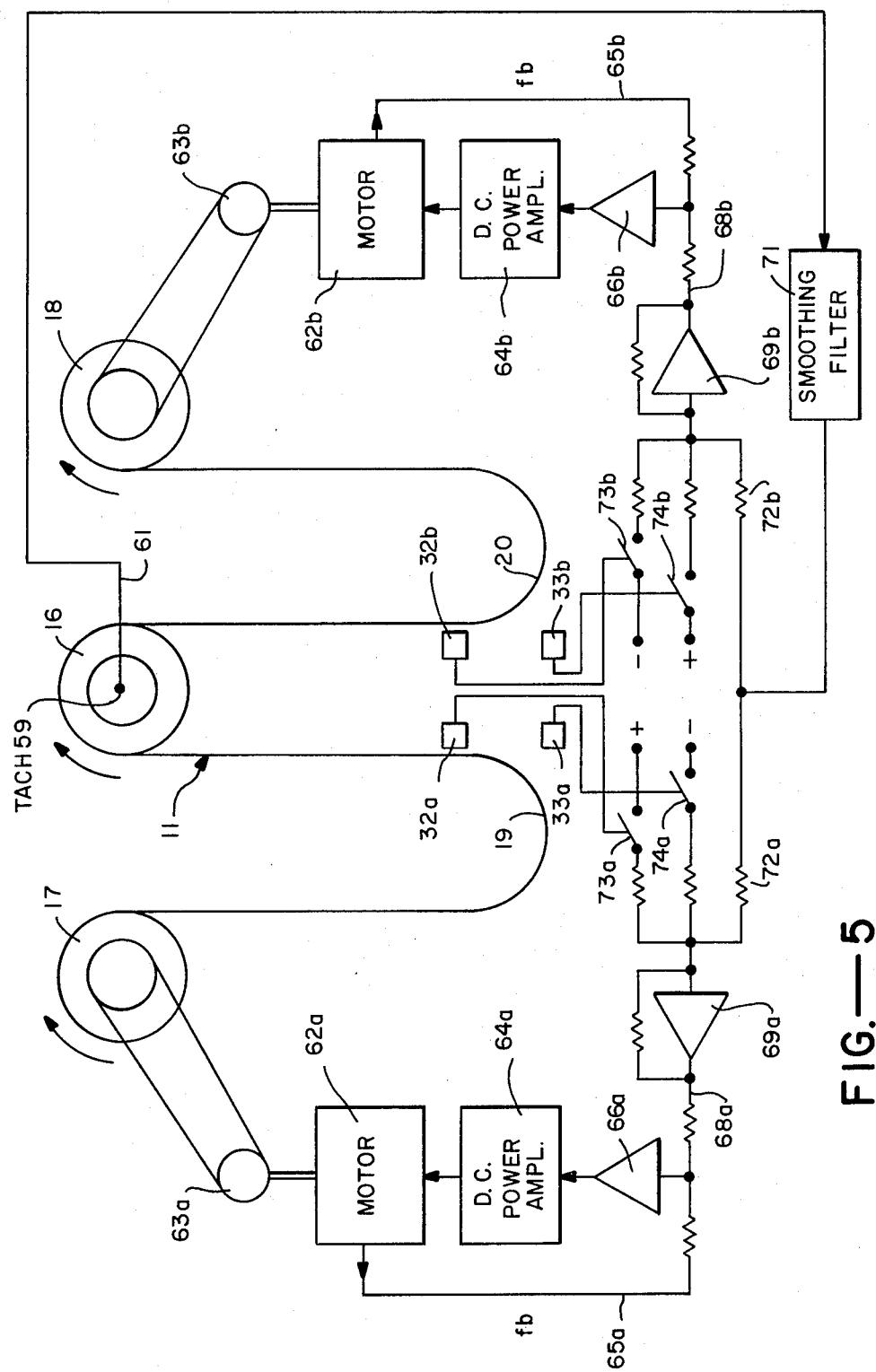
FIG.—5

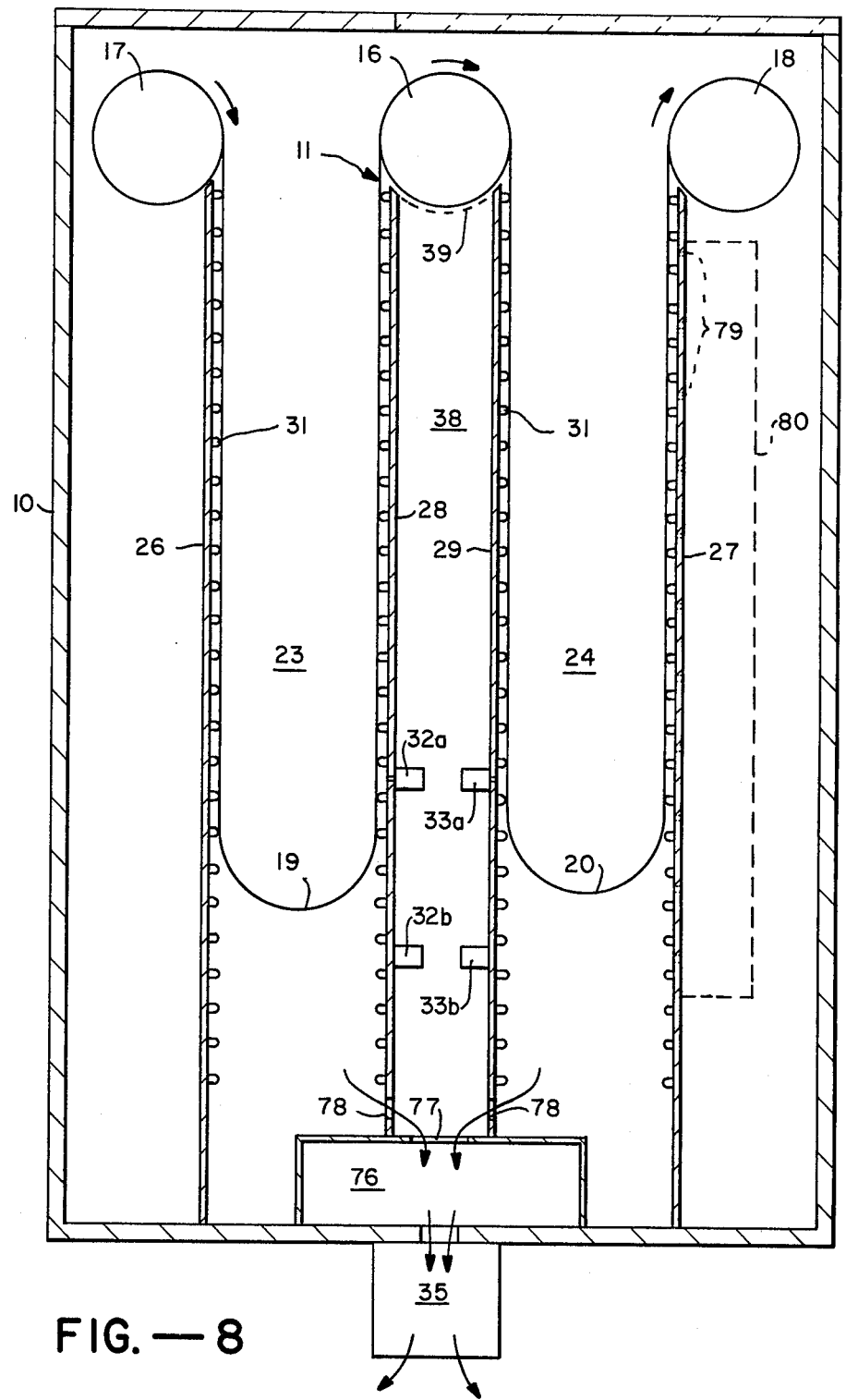
FIG.—8

GRAPHIC RECORDER

This is a continuation of application Ser. No. 192,820 filed Oct. 1, 1980 now abandoned.

The present invention is directed to a graphic recorder and more particularly to a recorder of the type that is a digital drum plotter having relatively wide paper.

In a digital plotter, it is well known to use vacuum column buffers to isolate the relatively high inertias of the supply and take-up rolls from the drum upon which plotting occurs. The drum usually includes pins driving the perforated edges of the paper. The vacuum columns provide a pair of loops to isolate the driving drum from the supply and take-up rolls. Since the plotter is usually computer driven, for example when used for in computer aided design systems, high speed and high accuracy in the movement of the paper is necessary.

In some design applications, a relatively wide paper such as 54 inches is necessary. Heretofore, one of the most common means of moving such paper has been by flat-bed and belt-bed plotters. These kinds of plotters are inherently of lower speed and more complicated and bulky.

On the other hand in a vacuum column buffer system, as linear paper speed or width increases, maintaining an even pull down by means of the vacuum on the plotting drum becomes more difficult. This is because as the loops are varied in depth in the vacuum columns the amount of air displaced is greater. One solution is to use larger size vacuum sources, but cost and noise are limiting factors.

Another possible solution is a complex interrelated servo system which causes the paper loops to maintain their relative positions as the supply and take-up rolls and the plotting drum rotate. However, if perfect control were obtained here, the necessity of the loops would be dissipated. In other words, the original purpose of the vacuum buffer system was a recognition of the fact that the much greater inertia of the supply and take-up reels made these very difficult to control in synchronism with the drum. Also, of course, a greater cost burden is placed on the system if the supply and take-up feed motors are large enough to respond quickly to high speed movements.

Thus, it is an object of the present invention to provide an improved graphic recorder.

It is a more specific object to provide a graphic recorder which will accommodate relatively wide paper in a vacuum buffer context but still allow high speed and high accuracy.

In accordance with the above objects, there is provided a graphic recorder for providing visually perceptible information on a web of flexible wide sheet material. A pair of rolls is provided with the flexible wide material wrapped thereon and extending therebetween. Drum means intermediate the pair of rolls has the sheet material partially wrapped thereon for moving the sheet material in at least one longitudinal direction from one roll to the other. A pair of wells accommodates respective loops of the sheet material formed between each roll and the drum means. Drive means connected to the drum means controllably rotates the drum means to move the sheet material. Head means juxtaposed with the drum means and movable in a transverse direction coincident with the rotary axis of the drum means graphically records on the sheet material. Vacuum means connected to both of the wells maintains a vacuum tending to pull the loops into the wells. Means are provided for cross-coupling the ambient vacuums in both the wells to tend to equalize such vacuums. First and second means controllably driving the rolls in a common direction. Sensing means located in each of the wells are electrically coupled to the first and second roll driving means for maintaining the loops within a predetermined range of movement within the wells. The rotary velocity of the drum means is sensed and causes the first and second roll driving means to rotate the rolls as a direct function of the velocity of the drum means.

FIG. 1 is a perspective view, partially cut away, of a graphic recorder embodying the present invention.

FIG. 2 is a cross-sectional view taken along line 2—2 of FIG. 1 of one embodiment of the invention.

FIG. 3 is a cross-sectional view taken along line 3—3 of FIG. 2.

FIG. 4 is a block diagram of a motion controller system for the drum of the plotter of FIG. 1.

FIG. 5 is a circuit schematic and diagrammatic view of the graphic recorder of FIG. 1.

FIG. 6 is an elevation view of a portion of FIG. 1.

FIG. 7 is a top view of FIG. 6.

FIG. 8 is a cross-sectional view similar to FIG. 2 of an alternative embodiment of the invention.

The graphic recorder illustrated in FIG. 1 includes a framework or cabinet 10 which will accommodate a flexible sheet of paper 11 having a width, for example, of 54 inches. Head means for graphically recording on sheet material 11 includes a belt 12 carrying a pen 13 which is illustrated as visually recording a line 14. Pen 13 and belt 12 move in a direction coincidence with the axis of rotation of a drum 16 over which paper 11 is moved.

This is shown more clearly in FIG. 2 where drum 16 is illustrated with sheet material 11 partially wrapped thereon. Paper 11 extends between supply roll 17 and a take-up roll 18. These roll designations of supply and take-up, of course, are nominal only since as with most plotters of this type they operate in a reverse manner also. Paper 11 is driven by the drum 16 and is isolated from the supply and take-up rolls 17 and 18 by the loops 19 and 20 which are formed in wells 23 and 24. Such wells include outer panels 26 and 27 and inner panels 28 and 29, respectively.

In order to aid movement of paper 11 over the panels from the roll to the drum and back again to the roll, there are provided protruding ribs 31 on the walls on panels which are spaced approximately three quarters of an inch apart. However, this spacing is not critical. Referring to FIG. 3 momentarily, the ribs extend horizontally along the entire width of the paper movement and extend beyond the indicated edge of the moving paper sheet. They are formed either separately or by stamping the sheet metal panels 26–29 themselves.

Since less contact area between paper and the panels is provided by the ribs 31, friction is reduced. At the same time, the channels formed by parallel ribs provide successive seals to the vacuum in the bottom of the wells which tends to pull the loops 19 and 20 into the wells 23 and 24. But any vacuum in the individual channels between the ribs, which would tend to increase friction, is prevented by the ends of the channels extending beyond the edges 30 of the paper 11. This allows venting to the atmosphere at the top of the recorder near rolls 17 and 18 and drum 16. Alternatively or additionally, vent holes through the panels to atmosphere extending the length of the rib channels allow a controlled leakage to occur to reduce friction. This is shown and discussed in FIG. 8.

Build-up of electrostatic forces is also minimized by ribs 31 since they do not present a flat surface for the paper sheet to electrostatically adhere itself to.

Wells 23 and 24 are deep enough so that loops 19 and 20 are of sufficient length to allow, for example, ink on the paper to dry before being rolled up.

To maintain the bottom of the loops 19 and 20 within a predetermined range of movement, a pair of top and bottom sensors 32a, b and 33a, b which are photoelectric cells sense the presence or absence of the paper in their line of sight. Thus, in the case of the sensor 32b if the bottom of the loop 19 extended below it, this would cause the slowing down of the motor driving roll 17 assuming this was the supply roll. The use of such sensors and the resultant control function is well-known in vacuum buffer column type graphic recorders.

In order to provide a vacuum hold down which will tend to pull the loops 19 and 20 into the wells 23 and 24, there is a column chamber 34 which extends along the bottom of both wells 23 and 24 and is formed by a center section 34a and left and right sections 34b and 34c (FIG. 3). As illustrated in FIG. 2, center section 34a is pumped by a vacuum pump 35 and is partially enclosed by top walls 36 and side wire mesh walls 37 for the purpose of safety. The arrows in both figures show the path of air movement. Thus, the cross-coupling to equalize the vacuums in the two wells is provided by left and right sections 34b, 34c and in general by common chamber 34.

Inner panels 28 and 29 form a central chamber 38. Normally there will be no vacuum within it between inner panels 28 and 29. Thus, a permanent closure could be made at 39. However, if desired, this can be left open and an additional opening made at 40 to connect central chamber 38 to the vacuum chamber 34. This will provide an additional hold-down effect for the paper 11 wrapped around drum 16.

The above described cross-coupling of the wells which tends to equalize the ambient vacuums in both wells has the following effect. Referring to FIG. 2, if for example, loop 20 were to suddenly move down in the well to increase pressure and if loop 19 were to simultaneously move upwardly to decrease pressure, cross-coupling would tend to equalize the vacuums to thus still maintain an equal hold-down force between paper 11 and drum 16 to maintain full contact between the drum and paper for accurate plotting.

FIG. 4 illustrates the drive means for drum 16. The drum has extending from its center axis a shaft 47; its bearings are not illustrated as a matter of convenience. The drum would normally include pins 48 with which perforations on the edges of paper 11 mate. Driving drum 16 is a motor 49 turning a metal gear 51 which in turn meshes with a plastic gear 52 mounted on shaft 47. The metal-plastic material difference provides for an effective wear-in of the drum drive to promote accuracy. Mounted on a shaft 47 is also a second gear 53 which drives encoder gear 54 coupled to an encoder 56. Gear 53 exclusively drives the encoder to thus reduce encoding error. In other words, if gear 54 were meshed with gear 52, variations caused by the motor drive might produce error. Encoder 56 is coupled to a computer interface servo control unit 57 which receives plotting instructions from a computer as to how drum 16 is to be driven. Plotting instructions are communicated to motor 49 via the power amplifier 58. In addition, motor 49 has a tachometer 59 sensing its rotary velocity which also aids the computer servo controller in driving drum 16. And as it will be explained below the output of tachometer 59 also extends on line 61 to the servo controllers for the supply and take-up rolls 17 and 18. The overall control system of the graphic recorder is illustrated in FIG. 5 where each roll 17 and 18 has its individual and separate servo control loop. That is, in the case of supply roll 17, there is a driving motor 62a driving a pulley 63a which is belted to roll 17. A D.C. power amplifier 64a of the pulse width modulated type drives motor 62a. The back emf of motor 62a is fedback on line 65a through amplifier 66a to power amplifier 64a to regulate speed. Such speed is selected by an input 68a which is the output of an operational amplifier 69a. The other roll 18 has similar servo control components designated with the suffix b.

In accordance with the invention, the operational amplifiers 69a and 69b are controlled by primary and secondary systems. The primary system includes line 61 from the tachometer 59 on drum 16 which carries a signal which is a direct function of the rotary velocity of the drum. This signal on line 61 is smoothed by a smoothing filter 71, whose design is not critical, and concurrently is connected through equal valued resistors 72a and 72b to the operational amplifiers 69a and 69b. The value of the resistors is chosen such that the signals driving the motors 62a and 62b drive them at a speed which equals the drum speed 16 when rolls 17 and 18 are of equal diameter. Of course, in any tape drive art, it is well known that as the diameter of the rolls change with a constant rpm the linear velocity of the sheet material will change. However, this compromise is made in order to simplify circuitry. Choosing in effect a median roll diameter works out in practice since the rollers (not shown) for the rolls 17 and 18 are of a large enough diameter so that a diametric ratio of a full roller to an empty roller is less than 2:1.

To illustrate the foregoing, assume a roller of 2.3 inches in diameter when empty and when full has a maximum diameter of 3.8 inches. Thus, this is less than a 2:1 ratio. In addition, of course, the median roll diameter is 3.1 inches and when this is approximately compared to the full condition or the empty condition there is less than an approximately 30 percent difference. What this means as far as the control technique of using the median roll diameter is that at the most there will have to be a approximately 30 percent correction by the secondary or takeup roll control system. This is provided by the top and bottom sensors 32a, 32b and 33a, 33b which at the appropriate times are switched in to drive the operational amplifiers 69a and 69b. Such switching by itself is well known in the art. The plus and minus voltages shown (which really indicate either an increase in speed or decrease in motor speed) are applied by the switches 73a and 74a in the case of the supply roll 17 and 73b and 74b in the case of the take-up roll 18. For example, as discussed above, when the photosensor 33a is actuated because the loop is extending too deep into the well, switch 74a is effectively closed to reduce the speed of the supply roll 17 as indicated by the negative sign.

However, as discussed above, this speed control is merely secondary to the primary speed control using the tachometer 59. Thus, there is effectively a continuous movement of the paper sheet 11. This is to be contrasted with the step of intermittent control provided by the use of the sensors 32 and 33 by themselves.

Thus, with the control system provided above there is a simultaneous rise and fall of the respective loops 19 and 20 to maintain even pull down force and prevent positive pressure from occurring, which would unwrap the paper 11 from the drum 16 causing inaccurate plotting. And this system minimizes changes in the movements of the loops in the wells that might otherwise occur if the sensors alone were to provide for maintaining the loops within their range of movement between the two sensors.

FIG. 8 is an alternative embodiment of the vacuum system of FIG. 2 and includes a vacuum chamber 76 which is pumped by a vacuum pump 35. Vacuum chamber 76 is actually a closed rectangular box and is connected to the center chamber 38 by an aperture 77. However, the central chamber 38 is coupled to the wells 23 and 24 below the bottom of the loops by a horizontal row of slots 78 in the bottom of panels 28 and 29. Thus, the air exits from the wells, as illustrated by the respective arrows into the vacuum chamber 76 and then through the vacuum pump 35 to the ambient atmosphere.

At the top of the central chamber 38, as indicated by the dashed line 39, this area may remain open which can tend to pull the paper 11 more firmly around the drum; or it can be closed. This depends upon the specific design configuration and perhaps the type of sheet material being used; for example, paper or coated paper of different types, plastic, etc.

Cross-coupling of the wells is provided by lateral passages adjacent chamber 34. These are structurally indicated by the sections 34b and 34c in FIG. 3. The remaining parts of FIG. 8 are identical to FIG. 2.

As discussed above and now shown in FIG. 8, vent holes 79 may provide additional or alternative venting for the rib channels. A sub-plenum 80 may be used with each panel (only one is shown in dashed outline) to provide atmospheric or even a positive pressure common to all vent holes.

FIG. 6 and 7 relate to the plotting head itself. The belt 12 and pen apparatus 13 is illustrated on paper 11. Belt 12 is driven by a drive pulley 82 connected to a drive motor 83. The efficiency of the connection is improved by use of a resilient rubber sleeve 84 around the pulley 82 which provides a good frictional interface with the metal belt 12. The other idler pulley 86 by means of the gearing 87 drives a shaft encoder 88. Encoder 88 and motor 83 would be connected to the computer interface servo controller 57. In order to ensure the accuracy of encoder 88, metal belt 12 is directly fitted on the metal pulley 86 so that the metal-to-metal interface, which is non-resilient compared to the driving system, provides for accurate shaft encoding.

Thus, the present invention has overcome the problems in driving paper sheets of wide widths at high speeds and with accuracy. This has been done by three interactive solutions, one of which is the cross-coupling of the wells in which the loops are maintained, the improvement in the drive system which includes the slaving of the supply and take-up of control motors to the drum speed and the addition of ribs to facilitate movement of the sheet over the well panels. The specific manner in which this has been done has been succinctly outlined. With the present control system, when one loop is moving down into a well, the other is made to move up. In effect, one loop pumps air through the cross-coupling which the other counteracts by suction. The slaving of the supply and take-up reel motors to the drum in effect gives advance time for acceleration and also minimizes the travel distance of the loops in the wells. Because of this effective advance warning coupled with the cross-coupling flow between the wells, the system is forgiving of imbalances if the paper loops do not move synchronously in opposite directions. Moreover, the cross-coupling system also allows for a median velocity of the supply and take-up rolls to be used thus avoiding the absolute servoing of the rolls to the drum which is prohibitive.

Thus, the above improvements allow operation with flexible sheet material of large widths at high speed using relatively modest vacuum sources with minimum size feed motors.

What is claimed:

1. A graphic recorder for providing visually perceptible information on a web of flexible wide sheet material comprising: a pair of rolls with flexible wide material wrapped thereon and extending therebetween; drum means intermediate said pair of rolls having said sheet material partially wrapped thereon for moving said sheet material in at least one longitudinal direction from one roll to the other; a pair of wells for accommodating respective loops of said sheet material formed between each roll and said drum means; drive means connected to said drum means for controllably rotating said drum means to move said sheet material; head means juxtaposed with said drum means and movable in a transverse direction coincident with the rotary axis of said drum means for graphically recording on said sheet material; vacuum means connected to both said wells for maintaining a vacuum tending to pull said loops into said wells; means for cross-coupling the ambient vacuums in both said wells and responsive to a sudden movement of said drum means, which tends to increase pressure in one of said wells and decrease pressure in the other of said wells, to tend to equalize such vacuums in said wells; first and second means for controllably driving said rolls in a common direction; sensing means located in each of said wells electrically coupled to said first and second roll driving means for maintaining said loops within a predetermined range of movement within said wells by increasing or decreasing the speeds of said roll driving means; means for sensing the rotary velocity of said drum means and causing said first and second roll driving means to rotate said rolls as a direct function of said velocity of said drum means; said wells including a pair of inner panels adjacent said drum means forming a center chamber, said panels having ribs formed on the surfaces of the panels adapted to be engaged by the sheet material, said vacuum means including a vacuum chamber connected to said center chamber and vacuum pump means connected to said vacuum chamber, said means for cross-coupling the wells including lateral passages at the bottom of said wells adjacent said vacuum chamber.

2. A graphic recorder for providing visually perceptible information on a web of flexible wide sheet material comprising: a pair of rolls with flexible wide material wrapped thereon and extending therebetween; drum means intermediate said pair of rolls having said sheet material partially wrapped thereon for moving said sheet material in at least one longitudinal direction from one roll to the other; a pair of wells for accommodating respective loops of said sheet material formed between each roll and said drum means; drive means connected to said drum means for controllably rotating said drum means to move said sheet material; head means juxtaposed with said drum means and movable in a transverse direction coincident with the rotary axis of said drum means for graphically recording on said sheet material; vacuum means connected to both said wells for maintaining a vacuum tending to pull said loops into said wells; means for cross-coupling the ambient vacuums in both said wells and responsive to a sudden movement of said drum means, which tends to increase pressure in one of said wells and decrease pressure in the other of said wells, to tend to equalize such vacuums in said wells; first and second means for controllably driving said rolls in a common direction; sensing means located in each of said wells electrically coupled to said first and second roll driving means for maintaining said loops within a predetermined range of movement within said wells by increasing or decreasing the speeds of said roll driving means; means for sensing the rotary velocity of said drum means and causing said first and second roll driving means to rotate said rolls as a direct function of said velocity of said drum means; each of said wells including a pair of inner and outer panels having a plurality of spaced horizontal protruding ribs over which said sheet material slides in its movement from one roll to the other, effective chambers being formed by said rib pairs and the sheet material, said panels including apertures for venting such chambers and sub-plenum means for connecting said apertures to a common pressure.

3. In a graphic recorder adapted to receive a flexible wide sheet of material for recording information thereon, a cabinet, spaced apart supply and takeup rollers rotatably mounted in the cabinet adapted to have the flexible wide sheet material wrapped thereon and extending therebetween, a drum mounted in said cabinet adapted to engage the sheet material extending between the supply and takup rollers for moving the sheet material in a direction longitudinally of the sheet material from one roller to the other, first and second wells disposed in the cabinet on opposite sides of the drum for receiving downwardly depending loops formed in the sheet material between the drum and the supply and takeup rollers, the first of said wells having a side wall extending in relatively close proximity to the supply roller and having another side wall extending in relatively close proximity to the drum, the second of said wells having a side wall adapted to extend in relatively close proximity to the takeup roller and having another side wall extending in relatively close proximity to the drum, drive means mounted in the cabinet for rotating said drum, drive means for rotating said supply and takeup rollers, means electronically coupling the drive means for the drum and the drive means for the supply and take up rollers whereby movements of said supply and take up rollers are slaved to the movement of the drum, head means mounted in said cabinet for graphically recording information on said sheet material when it is in engagement with the drum, means coupled to the lower extremities of said wells for cross coupling the lower extremities of the wells, and means also coupled to the lower extremities of said wells for creating reduced pressures in said wells urging said loops of sheet material downwardly into said wells toward the bottom extremities of the wells, said side walls having horizontally disposed ribs extending inwardly into the wells adapted to be engaged by the sheet material, said ribs forming channels extending laterally of the walls and opening into the wells beyond the sheet material to prevent the formation of chambers of reduced pressure which may inhibit the movement of the sheet material in the wells.

\* \* \* \* \*